United States Patent Office 2,921,908
Patented Jan. 19, 1960

2,921,908
SEQUESTERING COMPOSITION CONTAINING A CORROSION INHIBITOR

Homer W. McCune, Wyoming, Ohio, assignor to The Procter & Gamble Company, Cincinnati, Ohio, a corporation of Ohio No Drawing. Application July 2, 1956
Serial No. 595,118

6 Claims. (Cl. 252—110)

This invention relates to the protection of aluminum, zinc, and German silver from the action of certain organic chelating agents.

These organic chelating agents are alkaline salts of amino polycarboxylates such as ethylene diamine tetra acetic acid, N-hydroxy ethyl ethylene diamine triacetic acid and nitrilo triacetic acid. These chelating agents may be used in place of calcium sequestering phosphates in detergent compositions employing either the alkali saponified fatty-type soap or the synthetic detergents. They are also used in textile processing to chelate or sequester metals, for cleaning boilers of calcium scale, and for many other uses where the chelating of metals and alkaline earth metals is desired. Chelation is a specific type of sequestering in which a ring compound is formed by the sequestered ion closing the ring.

While these chelating agents will sequester metals, generally, they are more effective than most complexing agents in reacting with alkaline earth metals. The term metal sequestering as used herein and in the claims will refer to this reaction of alkaline earth metal ions with the sequestering agent.

These amino polycarboxylates in solution are corrosive to aluminum and zinc, and often tarnish the nickel, copper and zinc alloys known as German silver whether detergents are present or not.

I have found that certain organic phosphates hereinafter described and mixtures of the same, will protect aluminum and zinc from the corrosive action of amino polycarboxylic salts. These organic phosphates are also effective in minimizing the tarnishing of "German silver."

The amino carboxylates may be represented by the following formula:

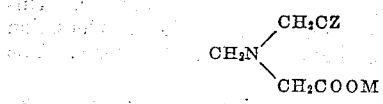

where M is an alkali metal ion, ammonium or substituted ammonium, Y is either COOM or

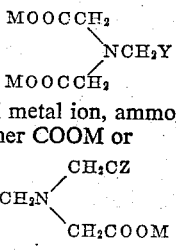

where Z is H$_2$OH or OOM and M has the values above.

These may be described as salts of ethylene diamine tetracarboxylic acids, salts of hydroxyalkyl ethylene diamine tricarboxylic acid, and nitrilo tricarboxylic acid, in which the carboxylic acids are acetic.

The organic phosphates effective in corrosion resistance are the monoalkyl, polyethylene glycol phosphates where the alkyl is preferably a long chain of 14 to 22 carbon atoms and the polyethylene glycol is preferably diethylene, triethylene or tetraethylene glycol. The alkyl polyethylene glycol phosphates can be used at a level of from about 3% to about 40% of the calcium sequestering amino polycarboxylates sequestrants and provide some retarding of corrosion at all levels within this range. The preparation of the reaction products of ethylene oxide and fatty alcohols is well known. It is described in U.S. Letters Patent 1,970,578, granted to Conrad Schoeller and Max Wittiwer on August 21, 1934, and U.S. Letters Patent 2,133,480, granted to Conrad Schoeller and Joseph Nusslein on October 18, 1938. The phosphation of the ethers thus prepared is carried out by adding phosphorus oxychloride slowly to the ethers in a well stirred closed vessel. Nitrogen is commonly used to blanket the reactants from contact with air and to sweep the hydrochloric acid formed in the reaction from the vessel.

The phosphated alkyl polyethylene glycols may also be represented by the formula R(OC$_2$H$_4$)$_x$OPO$_3$MN where R is an alkyl group of 14 to 22 carbons, $x$ is an integer from 1 to 7, M and N are taken from the group H, Na, K, NH$_4$ and alkylol substituted ammonium in which the alkylol is ethanol, propanol and isopropanol and the degree of substitution is mono, di, and tri.

The phosphated alkyl ethylene oxide condensation products described in the example below were made by condensing the indicated amount of ethylene oxide with fatty alcohol made from sperm oil, which in the process of reducing the fatty acids in the sperm oil to alcohol was hydrogenated to an iodine value less than 1. The alcohols were thus primarily those of 14, 16, 18 and 20 carbons, with about 1% of C$_{22}$ alcohols. The term "hardened sperm alcohol" is used to describe this product which contains the alcohols normally occurring in sperm oil, hydrogenated to an iodine value of less than 1, as well as the saturated fatty alcohols produced from the fatty acids of sperm oil.

EXAMPLE I

The inhibited composition (composition A) contained, all parts by weight:

20 parts of sodium salt of polypropylene benzene sulfonate, the polypropylene averaging about 12 carbons
50 parts of ethylene diamine tetra acetate-sodium salt
5 parts of the sodium salt of the phosphated reaction product of 2 moles of ethylene oxide with 1 mole of hardened sperm alcohol
20 parts of sodium sulfate
5 parts of water A "blank" was made in which the same amounts of the same ingredients were used, except that the 5% of phosphated alkyl ether, sodium salt, was replaced by sodium sulfate. The blank is called "composition B."

Corrosion tests were made with product concentrations of 0.5% in 7 grains of hardness (CaCO$_3$ equivalent) per gallon water, 3 hours at 140° F. for the aluminum and zinc; and 1.7 hours at 110° F. for the German silver. The aluminum was The Aluminum Corp. of America 303 alloy (formerly 3S) which contains 1.2% of manganese. The zinc was "special high grade." The German silver was 10% nickel, 18% zinc, and 72% copper. All pieces were 7.6 cm. long, 1.9 cm. wide and 0.1 cm. thick.

The test pieces were polished with steel wool, followed by wet pumice, and then washed with water and alcohol. After air drying they were weighed on an analytical balance. They were immersed in 200 milliliters of solution in a 250 ml. Erlenmeyer flask. The strips were leaning at an angle to the bottom of the flask of about 40°. The flasks were held at 140° F. for three hours, unless otherwise noted. After the tests all strips were removed and washed in water. The aluminum strips were then immersed in concentrated nitric acid for three minutes to remove products of corrosion. The aluminum strips were then washed in water and alcohol, air dried and weighed again. After the initial water wash the other metals were washed in water, air dried and weighed again. The weight loss in milligrams, listed below as wt. loss mgs. was thus determined.

*Results of corrosion tests*

|     | Aluminum | | Zinc | | German Silver | |
| --- | --- | --- | --- | --- | --- | --- |
|     | Wt. Loss, Mgs. | Appearance | Wt. Loss, Mgs. | Appearance | Wt. Loss, Mgs. | Appearance |
| (A) | 1.4 | Slightly Discolored. | 0.8 | Unchanged. | 0.1 | Unchanged. |
| (B) | 45 | Badly Discolored. | 6.9 | Etched. | 1.4 | Slightly Discolored. |

The effectiveness of the inhibitor in preventing corrosion is particularly striking on the aluminum test pieces, 1.4 milligrams vs. 45 milligrams.

EXAMPLE II

The inhibited composition A contained the following, all parts by weight:

30 parts of the sodium salt of the sulfated reaction product of 3 moles of ethylene oxide and 1 mole of middle cut coconut alcohol containing at least 65% $C_{12}$
30 parts of sodium salt of nitrilo triacetate
30 parts of sodium sulfate
10 parts of the sodium salt of phosphated reaction product of 4 moles of ethylene oxide with 1 mole of hardened sperm alcohol A "blank" (composition B) was made in which the same amounts of the same ingredients were used except that the phosphated ether was replaced by sodium sulfate. The corrosion tests were made as described in Example I.

*Result of corrosion tests*

|     | Aluminum | | Zinc | | German Silver | |
| --- | --- | --- | --- | --- | --- | --- |
|     | Wt. Loss, Mgs. | Appearance | Wt. Loss, Mgs. | Appearance | Wt. Loss, Mgs. | Appearance |
| (A) | 5.7 | Discolored. | 3.8 | Slightly Discolored. | 0.4 | Slightly Discolored. |
| (B) | 20 | Discolored. | 7.5 | Etched. | 2.0 | Discolored. |

EXAMPLE III

Inhibited Composition A:

10 parts of sodium salt of polypropylene benzene sulfonate
8 parts of sodium salt of tallow alcohol sulfate
52 parts of the 2 $H_2O$ hydrate of sodium ethylene diamine tetra acetate
20 parts of sodium sulfate
6 parts of the sodium salt of the phosphated reaction product of 4 moles of ethylene oxide with 1 mole of hardened sperm alcohol
3 parts of the monoethanolamide of coconut fatty acids
1 part of carboxymethyl cellulose Composition B was made from the same amount of the same ingredients as composition A except that sodium sulfate replaced the sodium salt of the phosphated alkyl ether.

The corrosion tests were carried out as described in Example I.

*Results of corrosion tests*

|     | Aluminum | | Zinc | | German Silver | |
| --- | --- | --- | --- | --- | --- | --- |
|     | Wt. Loss, Mgs. | Appearance | Wt. Loss, Mgs. | Appearance | Wt. Loss, Mgs. | Appearance |
| (A) | 1.3 | Slightly Discolored. | 0.8 | Unchanged. | 0.4 | Unchanged. |
| (B) | 49 | Badly Discolored. | 11 | Etched. | 1.8 | Discolored. |

The composition B appears quite corrosive but when inhibited with the phosphated alkyl polyglycol, as in A, the corrosion is greatly reduced.

EXAMPLE IV

The basic formula was:

52.4 parts of an amino polycarboxylate sodium salt—4 were used
   Sequestrant used:
      E—sodium salt of ethylene diamine tetra acetate
      V—sodium salt of N-hydroxyethyl ethylene diamine triacetic acid
      P—sodium salt of a hydroxy low molecular alkyl ethylene diamine triacetic acid (Perma Kleer)
      N—sodium salt of nitrilo triacetate
17.8 parts of sodium salt of polypropylene benzene sulfonate where the polypropylene averages $C_{12}$
5.9 parts of sodium salt of phosphated reaction product of 2 moles of ethylene oxide with 1 mole of hardened sperm alcohol The four preparations—E, V, P, and N—were made to the above formula, and for each a blank was prepared in which the phosphated alkyl ether was replaced by sodium sulfate.

Each preparation was dissolved in water to a concentration of 0.06% of the sodium alkyl benzene sulfonate. Corrosion tests were run by the standard method previously described using aluminum. The results were:

|         | Weight Loss, Milligrams | Appearance |
| ---     | --- | --- |
| E       | 0.2 | Unchanged. |
| E Blank | 27.0 | Discolored and etched. |
| V       | 4.0 | Slightly discolored. |
| V Blank | 34.0 | Badly discolored. |
| P       | 0.7 | Slightly discolored. |
| P Blank | 25.0 | Badly discolored. |
| N       | 0.6 | Unchanged. |
| N Blank | 14.0 | Slightly discolored. |

The blank in each case indicates the corrosiveness of the corresponding organic sequestrant when uninhibited.

The inhibiting effect of the phosphated alkyl polyethylene glycol is not limited to detergent compositions containing anionic detergents as is shown by the following example.

EXAMPLE V

A composition similar to E above was made using in place of the alkyl benzene sulfonate a nonionic. This was Sterox CD, a tall oil-ethylene oxide condensation product made by Monsanto Chemical Company. The formula was:

52.4 parts of sodium salt of ethylene diamine tetra acetate
17.8 parts of Sterox CD
5.9 parts of the sodium salt of the phosphated reaction product of 2 moles of ethylene oxide to 1 mole of hardened sperm alcohol.

This was dissolved in water to give a concentration of 0.06% of Sterox CD. A corrosion test on aluminum as described in Example I was made. The loss in weight was 0.2 milligrams. The appearance was slightly discolored.

EXAMPLE VI

Tests were made with strips of the aluminum described in Example I. The area of the strips was 29 square centimeters. The strips were immersed in 200 milliliters of solution at 60° C. for three hours. The solutions were made with distilled water and were adjusted to a pH of 9.5 at the start of the test.

| Composition | Wt. Loss in Mgs. | Appearance |
|---|---|---|
| 0.18% sodium ethylene diamine tetra acetate | 45 | Badly discolored. |
| 0.18% sodium ethylene-diaminetetraacetate and 0.02% sodium salt of the phosphated reaction product of 2 moles of ethylene oxide to 1 mole of hardened sperm alcohol. | 0.6 | Slightly discolored. |

This shows the effectiveness of the phosphated reaction products of ethylene oxide and the higher molecular alcohols in preventing corrosion of aluminum by the ethylene diamine tetra acetate salts in the absence of any detergent.

EXAMPLE VII

Under the same test conditions as used in Example VI, compositions containing soap were tested in distilled water solutions.

| Composition | Wt. Loss in Mgs. | Appearance |
|---|---|---|
| (A) 0.18% sodium ethylene diamine tetra acetate; 0.12% sodium tallow soap | 26 | Dull grey. |
| (B) 0.18% sodium ethylene diamine tetra acetate; 0.12% sodium tallow soap; 0.02% sodium salt of the phosphated reaction product of 2 moles of ethylene oxide to 1 mole of hardened sperm alcohol. | 9.0 | Dull grey. |
| (C) 0.18% sodium ethylene diamine tetra acetate; 0.12% sodium coconut soap | 1.2 | Discolored. |
| (D) 0.18% sodium ethylene diamine tetra acetate; 0.12% sodium coconut soap; 0.02% sodium salt of the phosphated reaction product of 2 moles of ethylene oxide to 1 mole of hardened sperm alcohol. | 0.1 | Slightly discolored. |

This example shows the effectiveness of the phosphated reaction products of ethylene oxide and higher molecular alcohols in reducing the corrosion of ethylene diamine tetra acetate in the presence of soap.

Detergent compositions in which the active ingredient is a soap, an anionic synthetic detergent or a nonionic synthetic, or a mixture of soap and synthetic detergent, and which contain amino polycarboxylates with 3 or more acetate groups, will be improved in corrosion inhibition by the addition of phosphated alkyl polyethylene glycol ethers and may be substituted for the detergent compositions of any of the foregoing examples with comparable results. Alternatively, comparable results are obtained by omission of the detergent components from the specific examples.

By detergent is meant the sodium and potassium soaps of fatty acids from oils of the coconut group, from tallow, from grease and from palm oil, (soluble soaps) and the synthetic detergents both anionic and nonionic.

In addition to the synthetic detergents mentioned in the examples, a wide range of synthetic detergents may be used. The following is by way of example.

| Class | Typified by— |
|---|---|
| Alkyl aryl sulfonates | Sodium polypropylene benzene sulfonate where the polypropylene is largely $C_{12}$. |
| Alkyl sulfates | Sodium lauryl sulfate. |
| Monoglyceride sulfate | Sodium dodecyl glyceryl sulfate (Sodium dodecyl propanol-2 sulfate). |
| Isethionates | Coconut ester of sodium isethionate. |
| Monoglyceride sulfonates | Dodecyl ether of propanol-2-sodium sulfonate. |
| Sulfoacetates | Coconut ester of sodium sulfoacetate. |
| Alkyl glyceryl ether sulfonates | Dodecyl ether of propanol-2 sodium sulfonate. |
| Sulfonated Fatty Amides | Lauric monoethanol amide sodium sulfate. |

Examples of nonionic synthetic detergents are the following.

| Class | Typified By— |
|---|---|
| Polyethylene glycols | Polyethylene glycol molecular weight 1,500. |
| Polyethyoxy esters of fatty acids | Stearic acid condensed with 5 moles of ethylene oxide. |
| Ethanol amides | Monoethanol amide of coconut fatty acids. |
| Polyethoxyethers of fatty alcohols | Dodecyl alcohol condensed with 5 moles of ethylene glycol. |
| Alkyl phenol ethoxy condensation products | Dodecyl phenol condensed with 3 moles of ethylene oxide. |

The alkyl polyethylene glycol phosphates are anionic compounds and cannot be used in detergent compounds comprising cationic detergents, as the cationic compounds and anionic compounds combine stoichiometrically to form an inert compound. Further, when amino polycarboxylates are used with cationic detergents, the alkyl polyethylene glycol phosphates are not effective as corrosion inhibitors.

Tests have been made with a phosphated octadecyl ethylene oxide condensate and it is as effective in corrosion resistance and tarnish inhibition as the hardened sperm alcohol preparations. The typical composition of hardened sperm oil alcohol is:

| | Pct. |
|---|---|
| $C_{14}$ alcohols | 4.5 |
| $C_{16}$ alcohols | 29 |
| $C_{18}$ alcohols | 52 |
| $C_{20}$ alcohols | 13.5 |
| $C_{22}$ alcohols | 1 |
| | 100 |

We have used preparations made with coconut alcohol and find them much less effective; evidently the large amount of $C_{12}$ and lower alcohols reduce the effectiveness. The range of alkyl radicals useful is from 14 to 22 carbons. Other alcohols, such as those from the "oxo" reaction may be utilized.

The alkaline material used to neutralize the carboxylic acids may be any one that yields a soluble polycarboxylate, sodium, potassium and ammonium being the most useful. The alkylol substituted ammonias may be used where a high degree of solubility is desired, as in a liquid detergent. The alkylols may be ethanol, propanol or isopropanol and the degree of substitution may be mono-, di-, or tri-.

It is feasible to add the phosphated alkyl polyglycol ethers to an alkaline detergent solution without previously neutralizing the two hydrogens of the phosphate that are not esterified to the polyglycol radical. Thus the phosphated polyglycol ethers are neutralized with the alkali of the polycarboxylate. Alternatively, the phosphated alkyl polyglycol ethers may be neutralized before adding to the amino polycarboxylates with sodium potassium, ammonium or alkylol substituted ammonium. The alkylols may be ethanol, propanol or isopropanol and the degree of substitution may be mono-, di-, or tri.

It may be desirable to neutralize only one of the hydrogens, for pH adjustment for instance.

Having thus described my invention, what I claim is:

1. A sequestering composition of inhibited corrosiveness, as used in dilute aqueous alkaline medium, toward alumiuum, zinc and German silver, consisting essentially of a calcium sequestering amino polycarboxylate which is a soluble salt of an amino polycarboxylic acid selected from the group consisting of ethylene diamine tetra carboxylic acid, hydroxy alkyl ethylene diamine tricarboxylic acid, and nitrilo tricarboxylic acid in which the carboxylic acids contain 2 carbon atoms, and as an inhibitor of corrosion a compound of the formula $$R(OC_2H_4)_xOPO_3MN$$

where R is an alkyl group of 14 to 22 carbons in chain length, $x$ is 1 to 7, M and N are taken from the group H, Na, K, NH$_4$ and alkylol substituted ammonium in which the number of alkylol substituents is 1 to 3 and the number of carbon atoms in each alkylol substituent is 2 to 3, said inhibitor being present in amounts of from about 3% to about 40% of said amino polycarboxylate.

2. The composition of claim 1 in which the calcium sequestering amino polycarboxylate is ethylene diamine tetra acetate.

3. The composition of claim 1 in which the calcium sequestering amino polycarboxylate is N-hydroxyethyl ethylene diamine triacetate.

4. The composition of claim 1 in which the calcium sequestering amino polycarboxylate is nitrolo triacetate.

5. The composition of claim 1 in which R is a mixture of C$_{16}$ and C$_{18}$ straight chain alkyls.

6. The composition of claim 1 in combination with a detergent selected from the group consisting of soluble soaps, anionic non-soap synthetic detergents, nonionic synthetic detergents, and mixtures thereof.

References Cited in the file of this patent

UNITED STATES PATENTS

| | | |
|---|---|---|
| 2,167,867 | Benning | Aug. 1, 1939 |
| 2,224,695 | Prutton | Dec. 10, 1940 |
| 2,240,957 | Munz | May 6, 1941 |
| 2,257,186 | Orthner et al. | Sept. 30, 1941 |
| 2,285,853 | Downing | June 9, 1942 |
| 2,315,072 | Nelson et al. | Mar. 30, 1943 |
| 2,346,154 | Denison et al. | Apr. 11, 1944 |
| 2,403,765 | Smith et al. | July 9, 1946 |
| 2,651,829 | Nusslein | Sept. 15, 1953 |
| 2,665,995 | Bishop | Jan. 12, 1954 |
| 2,728,645 | Vaughn | Dec. 27, 1955 |

FOREIGN PATENTS

| | | |
|---|---|---|
| 421,568 | Canada | July 18, 1944 |

OTHER REFERENCES

Handbook of Chemistry and Physics, 28th ed. pp. 1215, 1216, pub. by Chemical Rubber Pub. Co., Akron, Ohio (1944).

Sequestrene, pp. 1 and 39, pub. by Geigy Chem. Corp., N.Y. (1952).